United States Patent [19]
Smyers

[11] Patent Number: 5,948,136
[45] Date of Patent: Sep. 7, 1999

[54] HARDWARE AUTHENTICATION MECHANISM FOR TRANSMISSION OF DATA BETWEEN DEVICES ON AN IEEE 1394-1995 SERIAL BUS NETWORK

[75] Inventor: Scott D. Smyers, San Jose, Calif.

[73] Assignees: Sony Corporation, Tokyo, Japan; Sony Electronics, Inc., Park Ridge, N.J.

[21] Appl. No.: 08/903,546

[22] Filed: Jul. 30, 1997

[51] Int. Cl.⁶ .................................................. G06F 13/14
[52] U.S. Cl. ........................................... 71/107; 710/108
[58] Field of Search ...................................... 395/287, 288, 395/186, 187.01, 188.01, 200.59, 200.55, 200.57, 200.47, 200.49; 380/23, 24, 25, 49; 340/825.34; 364/286.4, 286.6

[56] References Cited

U.S. PATENT DOCUMENTS

| | | | |
|---|---|---|---|
| 4,405,829 | 9/1983 | Rivest et al ................................ | 380/30 |
| 4,486,853 | 12/1984 | Parson ....................................... | 345/418 |
| 5,204,961 | 4/1993 | Barlow ................................ | 395/187.01 |
| 5,239,648 | 8/1993 | Nukui ........................................ | 707/10 |
| 5,329,591 | 7/1994 | Magrill ...................................... | 380/25 |
| 5,388,212 | 2/1995 | Grube et al. .............................. | 395/186 |
| 5,418,854 | 5/1995 | Kaufman et al. ......................... | 380/23 |
| 5,455,953 | 10/1995 | Russell ..................................... | 395/739 |
| 5,560,008 | 9/1996 | Johnson et al. .......................... | 395/680 |
| 5,790,804 | 8/1998 | Osborne ............................... | 395/200.75 |

FOREIGN PATENT DOCUMENTS

| | | | |
|---|---|---|---|
| 0 684 721 A2 | 11/1995 | European Pat. Off. ........ | H04L 29/06 |
| WO 095/29560 | 11/1995 | WIPO .............................. | H04N 7/16 |

*Primary Examiner*—Zarni Maung
*Attorney, Agent, or Firm*—Haverstock & Owens LLP

[57] ABSTRACT

A hardware authentication mechanism ensures that a device receiving a packet of copy-protected data has been authorized by the transmitting device to receive the packet of data. The transmitting device authenticates a receiving device and verifies that the receiving device is authorized to receive the copy-protected data. Once authenticated, the transmitting device then sends a write authentication transaction, including a physical identifier value representing the transmitting device, to the receiving device. This authentication transaction is preferably addressed to a predefined address in the receiving device. This address is preferably communicated from the receiving device to the source device during the earlier authentication process. Alternatively, the address is assigned by convention. In an alternative embodiment, the authentication transaction also contains additional information, such as one or more encryption keys which are needed by the receiving device to decipher and use the copy-protected data. Upon receiving the authentication transaction, the receiving device then latches the physical identifier value into a dedicated register. When a data packet is then received at the receiving device, the interface hardware of the receiving device compares the physical identifier value in the received data packet to the value stored in the dedicated register. If the physical identifier value in the received data packet and the value stored in the dedicated register are the same, the interface hardware receives the data packet. If the physical identifier value in the received data packet and the value stored in the dedicated register are not the same, the interface hardware does not receive the data packet.

18 Claims, 3 Drawing Sheets

| data_length | 01 | channel | tCode | sy |
|---|---|---|---|---|
| header_CRC ||||| 
| sourceID | other CIP header fields ||||
| other CIP header fields |||||
| remaining data field |||||
| data_CRC |||||

| data_length | | 01 | channel | tCode | sy |
|---|---|---|---|---|---|
| header_CRC ||||||
| sourceID | other CIP header fields |||||
| other CIP header fields ||||||
| remaining data field ||||||
| data_CRC ||||||

Fig. 2

HARDWARE AUTHENTICATION MECHANISM FOR TRANSMISSION OF DATA BETWEEN DEVICES ON AN IEEE 1394-1995 SERIAL BUS NETWORK

FIELD OF THE INVENTION

The present invention relates to the field of securely transmitting data over a data bus. More particularly, the present invention relates to the field of securely transmitting data over an IEEE 1394–1995 serial bus by authenticating the devices involved in the transmission.

BACKGROUND OF THE INVENTION

The IEEE standard, "IEEE 1394 Standard For A High Performance Serial Bus," ratified in 1995, is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. The IEEE 1394–1995 standard bus architecture provides multiple channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

The IEEE 1394–1995 standard provides a high-speed serial bus for interconnecting digital devices thereby providing a universal I/O connection. The IEEE 1394–1995 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394–1995 standard is very thin in size compared to other bulkier cables used to connect such devices. Devices can be added and removed from an IEEE 1394–1995 bus while the bus is active. If a device is so added or removed the bus will then automatically reconfigure itself for transmitting data between the then existing nodes. A node is considered a logical entity with a unique address on the bus structure. Each node provides an identification ROM, a standardized set of control registers and its own address space.

The IEEE 1394–1995 standard defines a protocol as illustrated in FIG. 1. This protocol includes a serial bus management block 10 coupled to a transaction layer 12, a link layer 14 and a physical layer 16. The physical layer 16 provides the electrical and mechanical connection between a device or application and the IEEE 1394–1995 cable. The physical layer 16 also provides arbitration to ensure that all devices coupled to the IEEE 1394–1995 bus have access to the bus as well as actual data transmission and reception. The link layer 14 provides data packet delivery service for both asynchronous and isochronous data packet transport. This supports both asynchronous data transport, using an acknowledgement protocol, and isochronous data transport, providing real-time guaranteed bandwidth protocol for just-in-time data delivery. The transaction layer 12 supports the commands necessary to complete asynchronous data transfers, including read, write and lock. The serial bus management block 10 contains an isochronous resource manager for managing isochronous data transfers. The serial bus management block 10 also provides overall configuration control of the serial bus in the form of optimizing arbitration timing, guarantee of adequate electrical power for all devices on the bus, assignment of the cycle master, assignment of isochronous channel and bandwidth resources and basic notification of errors.

Providers of content which is transmitted between devices over networks such as an IEEE 1394–1995 serial bus network are continually concerned about unauthorized copying of their programs by unscrupulous persons. For example, in a network such as an IEEE 1394–1995 serial bus network, when content is transmitted from a playing device, such as a digital video disk, to a display device, such as a television, this content stream can also be snooped and recorded by an unauthorized recording device, such as a video cassette recorder. The digital transmission of copy protected information between consumer electronics devices and personal computers has led to additional concern among content providers, due to the new ability to make lossless copies of original source material. The personal computers provide a particular challenge due to the ability of users to load software to circumvent copy protection mechanisms. What is needed is a method and apparatus which is used to prevent such unauthorized copying or duplication. What is further needed is such a copy prevention system which cannot be circumvented by software running within a computer system.

SUMMARY OF THE INVENTION

A hardware authentication mechanism ensures that a device receiving a packet of copy-protected data has been authorized by the transmitting device to receive the packet of data. The transmitting device authenticates a receiving device and verifies that the receiving device is authorized to receive the copy-protected data. Once authenticated, the transmitting device then sends an IEEE 1394 write transaction, including a physical identifier value representing the transmitting device, to the receiving device. For purposes of discussion, this write transaction is herein referred to as an authentication transaction. This authentication transaction is preferably addressed to a predefined address in the receiving device. This address is preferably communicated from the receiving device to the source device during the earlier authentication process. Alternatively, the address is assigned by convention. In an alternative embodiment, the authentication transaction also contains additional information, such as one or more encryption keys which are needed by the receiving device to decipher and use the copy-protected data. Upon receiving the authentication transaction, the receiving device then latches the source physical identifier value into a dedicated register. When a data packet is then received at the receiving device, the interface hardware of the receiving device compares the physical identifier value in the received data packet to the value stored in the dedicated register. If the physical identifier value in the received data packet and the value stored in the dedicated register are the same, the interface hardware receives the data packet. If the physical identifier value in the received data packet and the value stored in the dedicated register are not the same, the interface hardware does not receive the data packet.

BRIEF DESCRIPTION OF THE DRAWINGS

FIG. 2 illustrates a format of an isochronous data packet of the IEEE 1394–1995 standard.

DETAILED DESCRIPTION OF THE PRESENT INVENTION

Figure 1:
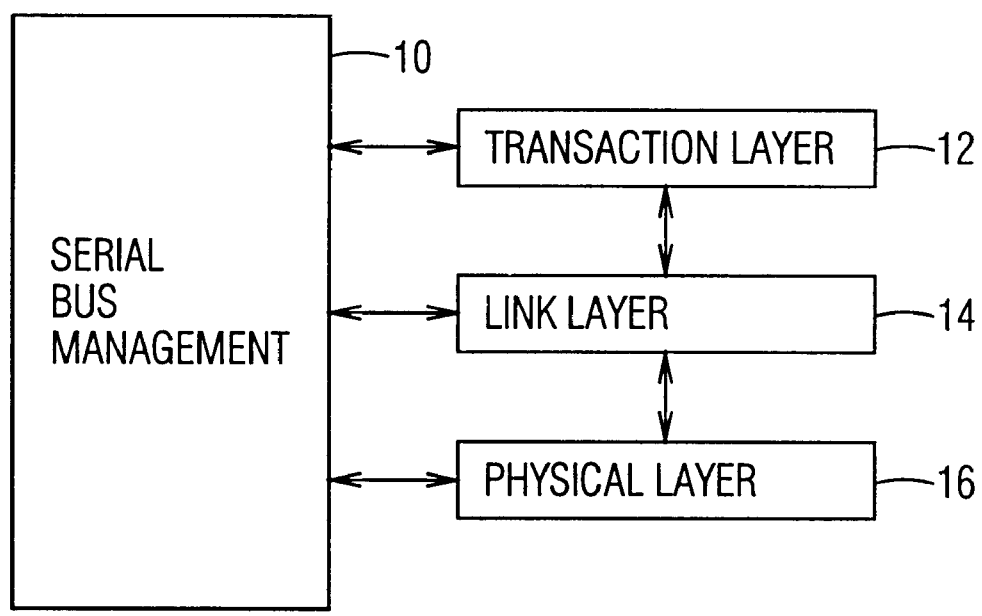
FIG. 1 illustrates a protocol defined by the IEEE 1394–1995 standard.

A hardware authentication mechanism ensures that a device receiving a packet of copy-protected data has been authorized by the transmitting device to receive the packet of data. After the transmitting device authenticates the receiving device and determines that the receiving device is an authorized listening device, the transmitting device then transmits a write transaction to a dedicated register in the receiving device. When this write transaction is received by the receiving device, the hardware interface circuit within the receiving device latches the source identifying value from the header of this write transaction into the dedicated register. Thereafter, when receiving copy-protected data, the source identifying value from the header of the data packets is compared to the value stored in the dedicated register. If the values are the same, the interface circuit will then accept the data packet and allow the receiving device to process the data appropriately. If the values are not the same, the interface will prevent the receiving device from receiving the data packet.

The authentication write transaction is preferably addressed to a predefined address in the receiving device. This predefined address is preferably communicated from the receiving device to the source device during the earlier authentication process. Alternatively, the address is assigned by convention. In an alternative embodiment, the authentication transaction also contains additional information, such as one or more encryption keys which are needed by the receiving device to decipher and use the copy-protected data.

Once a computer system or any other appropriate receiving device includes the authentication system of the present invention implemented in hardware, software cannot be used to circumvent this authentication system. In this manner, a device cannot authenticate itself as a valid receiver of protected data using software. To be authenticated using the hardware system of the present invention, a receiving device must receive the authentication write transaction and latch the source identifying value from the header of that transaction. Accordingly, if a device including the authentication mechanism of the present invention is provided to a user, the user cannot then manipulate the device to receive streams of data for which the device is not authorized.

A format of an isochronous data packet for transmission over an IEEE 1394–1995 serial bus network is illustrated in FIG. 2. The format of the data packet also complies with the IEC 1883 standard. The data_length field contains a value representing the number of bytes of data within the data field, including the number of bytes within the common isochronous packet (CIP) header. The channel field contains the channel number on which the isochronous packet is transmitted. The tCode field contains the transaction code for the packet. For isochronous data packets, the tCode field contains either a value of Ah or Ch. The sy field contains a synchronization flag used in some applications to synchronize the data in the current isochronous packet with some application specific event. The sourceID field contains a six bit value representing the physical identifying code of the node which is transmitting the packet. The values in the other CIP header fields depend on the format of the data being transmitted in the packet. The data field, if present, contains the content data being transmitted in the packet. The data field can contain digital audio, digital video or some other type of content copy-protected data. The data within the data field can also be encrypted or scrambled.

The authentication mechanism of the present invention is alternatively, only enabled when the copy-protected data is tagged using a tCode value of "C." Data which is not copy protected is tagged using a tCode value of "A." If the data is transmitted from the source without a tCode value of "C", then the authentication mechanism of the present invention does not interfere with the reception of the data.

Figure 3:
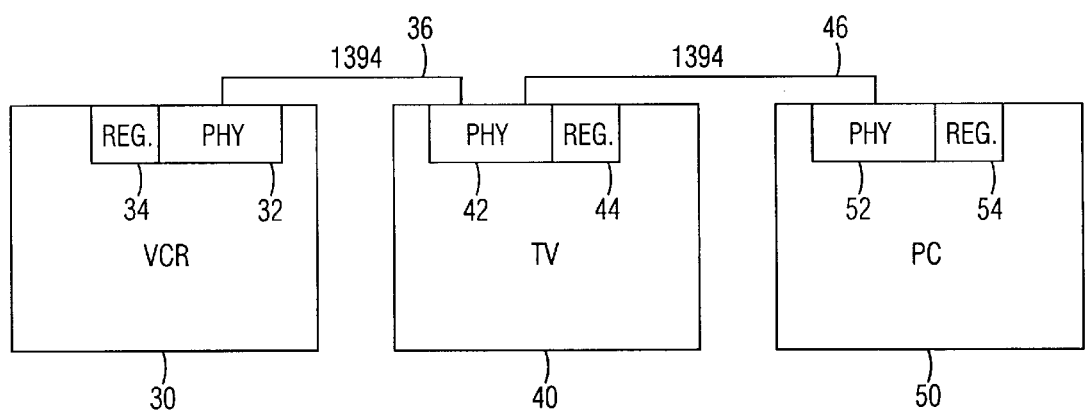
FIG. 3 illustrates a block diagram of an IEEE 1394–1995 serial bus network including a plurality of devices.

A block diagram of an exemplary IEEE 1394–1995 serial bus network including a plurality of devices is illustrated in FIG. 3. While the circuit of FIG. 3 shows a network having three nodes, it will be apparent to one of ordinary skill in the art that the invention will operate with more or fewer nodes including any form of application device configured to operate over an IEEE 1394–1995 serial bus network. A video cassette recorder (VCR) 30 includes a physical transceiver circuit 32 which is coupled to a physical transceiver circuit 42 of a television (TV) 40 through an IEEE 1394–1995 serial bus cable 36. The physical transceiver circuit 42 of the TV 40 is also coupled to a physical transceiver circuit 52 of a personal computer 50 through an IEEE 1394–1995 serial bus cable 46. Together, the devices 30, 40 and 50 form an IEEE 1394–1995 serial bus network. The VCR 30 includes a dedicated register 34 for storing the physical identifying code of a transmitting device when the VCR 30 is receiving copy-protected data. The TV 40 includes a dedicated register 44 for storing the physical identifying code of a transmitting device when the TV 40 is receiving copy-protected data. The personal computer 50 includes a dedicated register 54 for storing the physical identifying code of a transmitting device when the personal computer 50 is receiving copy-protected data.

Before transmitting data to a device, a transmitting device will generally perform some type of authentication operation to ensure that the receiving device is the correct device to which the transmitting device intends to send data. As will be apparent to those skilled in the art, there are many well known authentication operations used to verify a receiving device. Once the transmitting device has completed the authentication operation and has determined that the receiving device is the correct device and authorized to receive the copy-protected data, then the transmitting device, as the last step of authentication, sends an asynchronous write transaction to a register within the receiving device. The address and size of this register is preferably known by the transmitting device. Alternatively, the address and size of this register can be determined by the transmitting device as part of the authentication process.

When the receiving device receives the asynchronous write transaction from the transmitting device, the interface hardware within the receiving device latches the value of the sourceID field from the packet header of the transaction into the dedicated register. This completes the authentication process. Once the authentication process is complete the transmitting device will then begin to send isochronous data packets containing copy protected data to the receiving device. Each of the data packets includes the physical identifying value of the transmitting device in the sourceID field of the CIP header. When receiving a data packet, the receiving device will only accept the data packet if the value in the sourceID field of the CIP header matches the value stored in the dedicated register. If the value in the sourceID field of the CIP header does not match the value stored in the dedicated register, the interface hardware of the receiving device will prevent the receiving device from accepting the data packet. If the value in the sourceID field of the CIP header does match the value stored in the dedicated register, the receiving device will receive the data packet and process it appropriately.

The dedicated register within the receiving device can only be loaded using a write transaction from an authenticated transmitting device. User modifiable or user loadable software running on the receiving device cannot load the sourceID of the authenticated transmitter of a stream of data. Therefore, only an authenticated receiving device verified by the transmitting device, will be capable of receiving a stream of copy-protected data.

When a stream of copy-protected data is to be sent from the VCR 30 to the TV 40 for display by the TV 40, the VCR 30 will first perform an authentication process to verify that the TV 40 is the correct device and authorized to receive the stream of copy-protected data. Once the VCR 30 has verified that the TV 40 is authorized to receive the stream of data, the VCR 30 then transmits an asynchronous write transaction over the IEEE 1394–1995 serial bus network to the dedicated register 44 within the TV 40. This asynchronous write transaction includes the physical identifier of the VCR 30 in the sourceID field of the header.

When the TV 40 receives the asynchronous write transaction from the VCR 30, the physical transceiver circuit 42 latches the value of the sourceID field from the packet header of the transaction into the dedicated register 44. The VCR 30 will then begin sending the packets of data to the TV 40, included within the stream of copy-protected data. With each packet of data received, the physical transceiver circuit 42 within the TV 40 compares the value in the sourceID field of the received packets to the value stored in the dedicated register 44. If the value in the sourceID field of the headers of a received packet matches the value stored in the dedicated register 44, the physical transceiver circuit 42 will accept the packet and forward it to the appropriate components within the TV 40. If the value in the sourceID field of the headers of a received packet does not match the value stored in the dedicated register 44, the physical transceiver circuit 42 will not accept the packet.

In this manner, the authentication mechanism of the present invention uses a hardware implementation to ensure that a device only receives copy-protected data that is specifically directed to the device. This hardware mechanism is implemented using a dedicated register within a receiving device as a hardware gate. If the value in the sourceID field of the header of a received packet matches the value in the register, then the gate is open and the packet is received. However, if the value in the sourceID field of the header of a received packet does not match the value in the register, then the gate is not open and the packet is not received. Because the authentication mechanism is implemented in hardware and can only be loaded using a write transaction from the authenticated transmitting device, user modifiable or user loadable software running on the receiving node cannot load a value in the dedicated register in order to capture a stream of data directed to another device. Accordingly, an unauthorized user could not program the PC 50 to capture the stream of data being transmitted from the VCR 30 to the TV 40, because the hardware authentication mechanism of the present invention, including the physical transceiver 52 and the dedicated register 54, would not receive the data packets. The hardware authentication mechanism within the PC 50 will only receive the data packets if the PC 50 has been previously authenticated by the VCR 30 as an appropriate receiving device.

It should be apparent to those skilled in the art that while a dedicated register is used in the preferred embodiment to store the value of the transmitting device's physical identifier, alternatively any other appropriate storage circuit or means can be used to store this value. It should further be apparent to those skilled in the art that while the above description of the present invention has discussed transmission of data on a single isochronous channel, the present invention can be implemented simultaneously on multiple isochronous channels, each having its own authentication mechanism. It should also be apparent that the authentication mechanism of the present invention can be implemented on any type of data stream, including but not limited to both isochronous and asynchronous data streams.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the present invention is used with an IEEE 1394–1995 serial bus structure, the present invention can also be implemented within appropriately configured devices within other bus structures.

I claim:

1. A method of authenticating a receiving device for receiving a stream of data comprising the steps of:
   a. receiving a first identifying value from an originating device, indicating that the receiving device is authorized to receive data packets from the originating device;
   b. latching the first identifying value into a storage circuit;
   c. receiving packets of data each including a second identifying value representing the originating device; and
   d. accepting packets in a receiving device only when the second identifying value matches the first identifying value in the storage circuit.

2. The method as claimed in claim 1 further comprising the step of comparing the first identifying value to the second identifying value.

3. The method as claimed in claim 2 wherein packets of data having the second identifying value which does not match the first identifying value are rejected.

4. The method as claimed in claim 3 wherein the storage circuit is a dedicated register.

5. The method as claimed in claim 4 wherein the orginating device and the receiving device are coupled together within an IEEE 1394–1995 serial bus network.

6. The method as claimed in claim 5 wherein the first and second identifying values are included within sourceID fields in different packet headers.

7. The method as claimed in claim 5 wherein the first identifying value is transmitted within an asynchronous write transaction.

8. The method as claimed in claim 7 wherein the packets of data make up an isochronous stream of data.

9. An apparatus for authenticating a receiving device comprising:
   a. a storage circuit for storing a first identifying value received from a transmitting device indicating that the receiver is authorized to receive data packets from the transmitting device; and b. a comparing circuit coupled to the storage circuit for comparing a second identifying value from received data packets to the first identifying value, wherein only received data packets having the second identifying value matching the first identifying value are provided to the receiving device.

10. The apparatus as claimed in claim 9 wherein the first identifying value is received within a write transaction and latched into the storage circuit.

11. The apparatus as claimed in claim 10 wherein the storage circuit is a dedicated register.

12. The apparatus as claimed in claim 9 wherein the apparatus is coupled as a node within an IEEE 1394–1995 serial bus network.

13. The apparatus as claimed in claim 12 wherein the second identifying value is included within a sourceID field in a header of the received data packets.

14. An apparatus for receiving communications comprising:

a. a receiving circuit for receiving communications from other devices;

b. a storage circuit coupled to the receiving circuit for storing a first identifying value received from a transmitting device, indicating that the receiving circuit is authorized to receive data packets from the transmitting device; and c. a comparing circuit coupled to the receiving circuit and to the storage circuit for comparing a second identifying value from received data packets to the first identifying value, wherein only received data packets having a second identifying value matching the first identifying value are provided to the apparatus and received data packets having a second identifying value not matching the first identifying value are rejected.

15. The apparatus as claimed in claim 14 wherein the first identifying value is received within a write transaction and latched into the storage circuit.

16. The apparatus as claimed in claim 15 wherein the apparatus is coupled as a node within an IEEE 1394–1995 serial bus network.

17. The apparatus as claimed in claim 16 wherein the second identifying value is included within a sourceID field in a header of the received data packets.

18. The apparatus as claimed in claim 17 wherein the storage circuit is a dedicated register.

* * * * *

UNITED STATES PATENT AND TRADEMARK OFFICE
CERTIFICATE OF CORRECTION

PATENT NO. : 5,948,136
DATED : September 7, 1999
INVENTOR(S) : Scott D. Smyers

It is certified that error appears in the above-identified patent and that said Letters Patent is hereby corrected as shown below:

On the Title Page:
Item [56] References Cited please insert
-- OTHER PUBLICATIONS R. Bloks, "The IEEE-1394 High Speed Serial Bus", *Philips Journal of Research*, vol. 50, No. 1/2 (July 1996), pp. 209-216.
L. Guillou et al., "Encipherment and Conditional Access", *SMPTE Journal*, vol. 103, No. 6 (June 1994), pp. 398-406.--

In the Claims:
 Claim 9, Col. 6, line 67, insert a comma --,-- between "device" and "indicating".

Signed and Sealed this

Twenty-first Day of March, 2000

Attest:

Q. TODD DICKINSON

*Attesting Officer*     *Commissioner of Patents and Trademarks*